May 4, 1954 G. C. HUPPERTZ 2,677,392
MULTIPLE VALVE ASSEMBLY WITH
SELECTIVE OPERATOR THEREFOR
Filed Dec. 20, 1948 4 Sheets-Sheet 2

INVENTOR.
George C. Huppertz,
BY
Wilkinson Huxley Byron & Hume
ATTYS

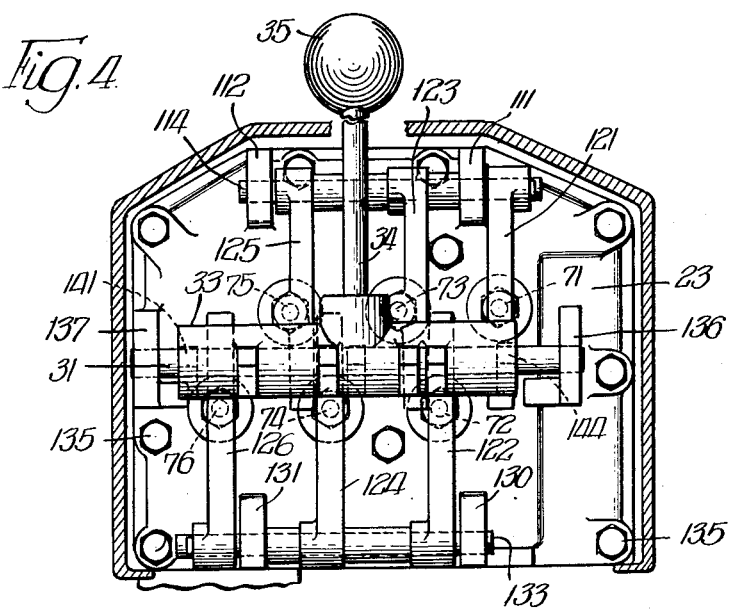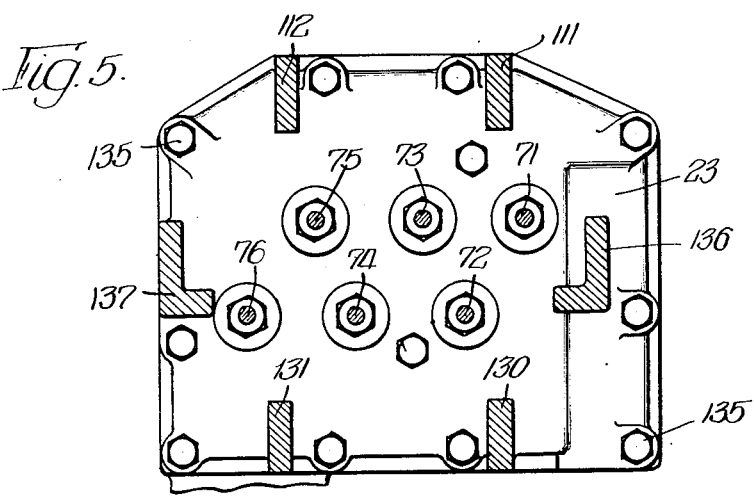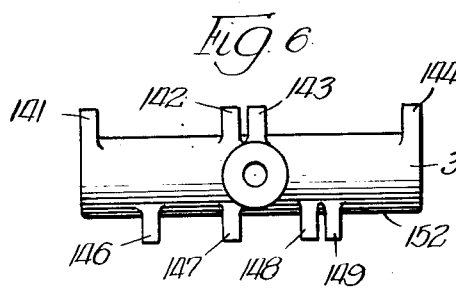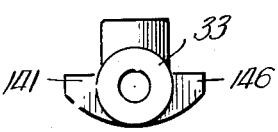

May 4, 1954
G. C. HUPPERTZ
2,677,392
MULTIPLE VALVE ASSEMBLY WITH
SELECTIVE OPERATOR THEREFOR
Filed Dec. 20, 1948
4 Sheets-Sheet 4
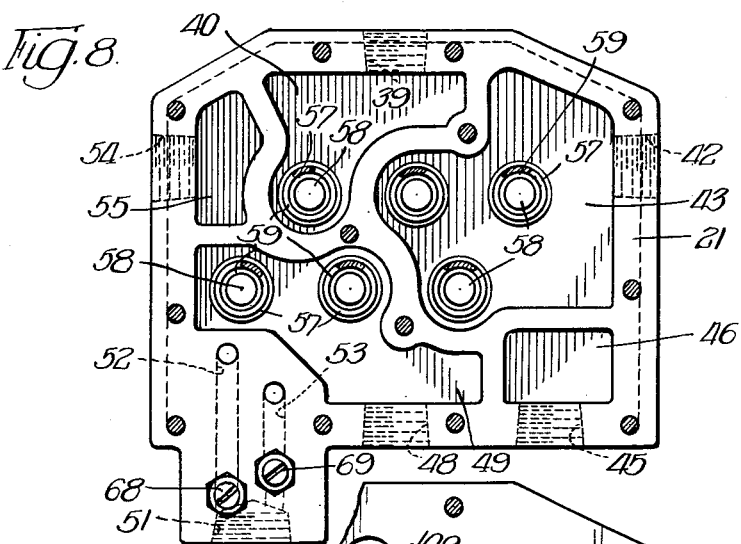
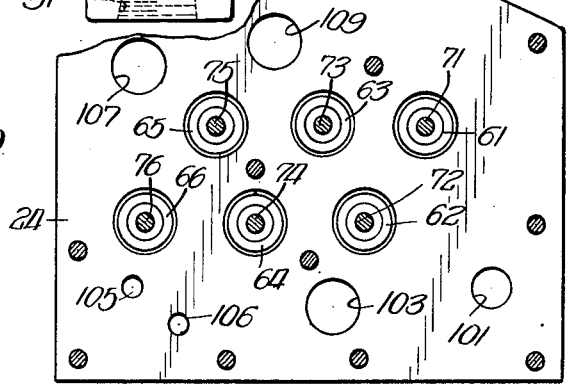
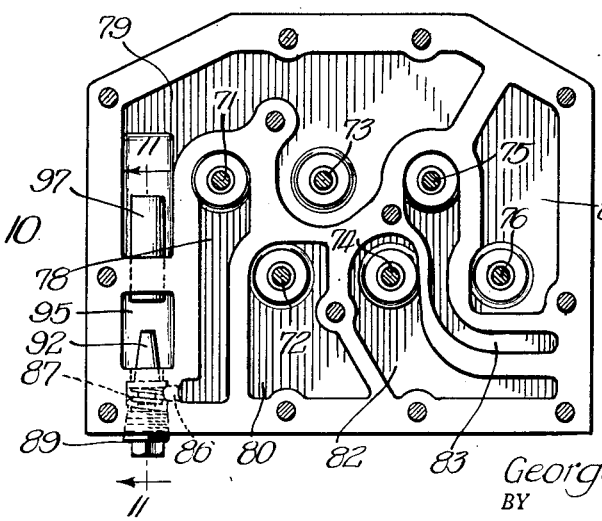
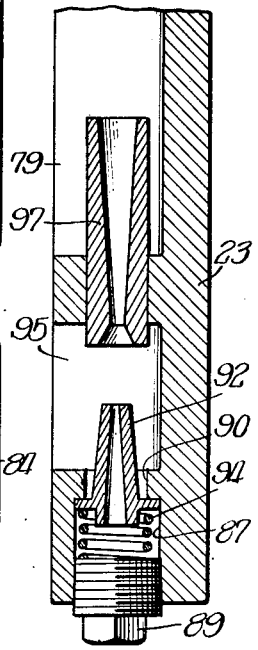
INVENTOR.
George C. Huppertz,
BY
Wilkinson Huxley Byron Hume
Attys.

Patented May 4, 1954

2,677,392

UNITED STATES PATENT OFFICE 2,677,392

MULTIPLE VALVE ASSEMBLY WITH SELECTIVE OPERATOR THEREFOR

George C. Huppertz, St. Charles, Ill., assignor to Raylee Engineering, Inc., St. Charles, Ill., a corporation of Illinois Application December 20, 1948, Serial No. 66,166

4 Claims. (Cl. 137—635)

This invention relates to a new and improved multiple valve construction and more particularly to a valve construction including a plurality of valves and interconnecting chambers and passages, together with means for operating the valves in predetermined combinations and sequences.

While a multiple valve of this character is adapted for many uses where fluid flows are to be controlled for different types of cyclic operation, it has been particularly designed for use in the control of water softeners and their cycle of flows incident to regeneration of the softening material, and it has been shown and will be described in that association.

The present construction is in the nature of an improvement over the multiple valve shown in my prior application, Serial No. 687,336, filed July 31, 1946, which issued December 4, 1951 as Patent No. 2, 577,524.

The construction of the present application comprises a multiple valve assembly including body and housing members having ports, passages and chambers formed therein, the preferred form, as shown, also including a valve plate which serves to provide valve seats for the several valves and, in addition, serves as a closure for chambers in the other members. The valve plate also provides certain open passages between chambers in the other members in addition to the valve controlled passages. The improved valve has all of the connected piping secured to the base or body member so that the valve plate and upper or housing member may be removed in order to clean, adjust or repair the valve without disturbing any of the piping connections.

A single operating lever is provided, this lever serving to both rotate and move longitudinally a valve actuating assembly. This lever and actuating assembly serve to open valves in predetermined combinations in a designated sequence so as to permit the multiple valve assembly to be used by unskilled persons to correctly carry out the several steps involved in cleaning and rejuvenating the softener chemicals. When connected in the softener lines as directed, the multiple valve also insures that all fluid flows pass in the correct direction through the softener tank. In addition, the valve provides adjustable means for controlling the effective areas of passages controlled by certain of the valves to thus control the rate of fluid flow during certain steps in the cycle of operations.

It is an object of the present invention to provide a new and improved multiple valve construction.

It is also an object to provide a multiple valve including means for selectively operating certain of the valves in predetermined combination.

It is an additional object to provide multiple valve operating elements in combination with means which permit adjustment of the effective area of flow of passages controlled by predetermined valves.

It is a further object to provide a multiple valve assembly having valve seat means separate from the valve members and from the body and cover members providing the chambers and passages.

It is another object to provide a multiple valve assembly in which all parts are readily accessible without disconnecting any of the associated piping.

It is also an object to provide a multiple valve which may be operated by unskilled persons and which is adapted for commercial production and use.

Other and further objects will appear as the description proceeds.

I have shown certain preferred embodiments of my invention in the accompanying drawings, in which—

Figure 4 is a section taken on line 4—4 of Figure 3;

Figure 5 is a section taken on line 5—5 of Figure 3;

Figure 6 is a side view of the sliding cam member;

Figure 7 is a view of Figure 6 as seen from the right end;

Figure 8 is a face view of the valve body member;

Figure 9 is a face view of the valve seat member showing the associated valves;

Figure 10 is a view of the rear or under face of the valve closure member; and

Figure 11 is a fragmentary sectional view, on an enlarged scale, of the jet construction taken on line 11—11 of Figure 10.

Figure 1:
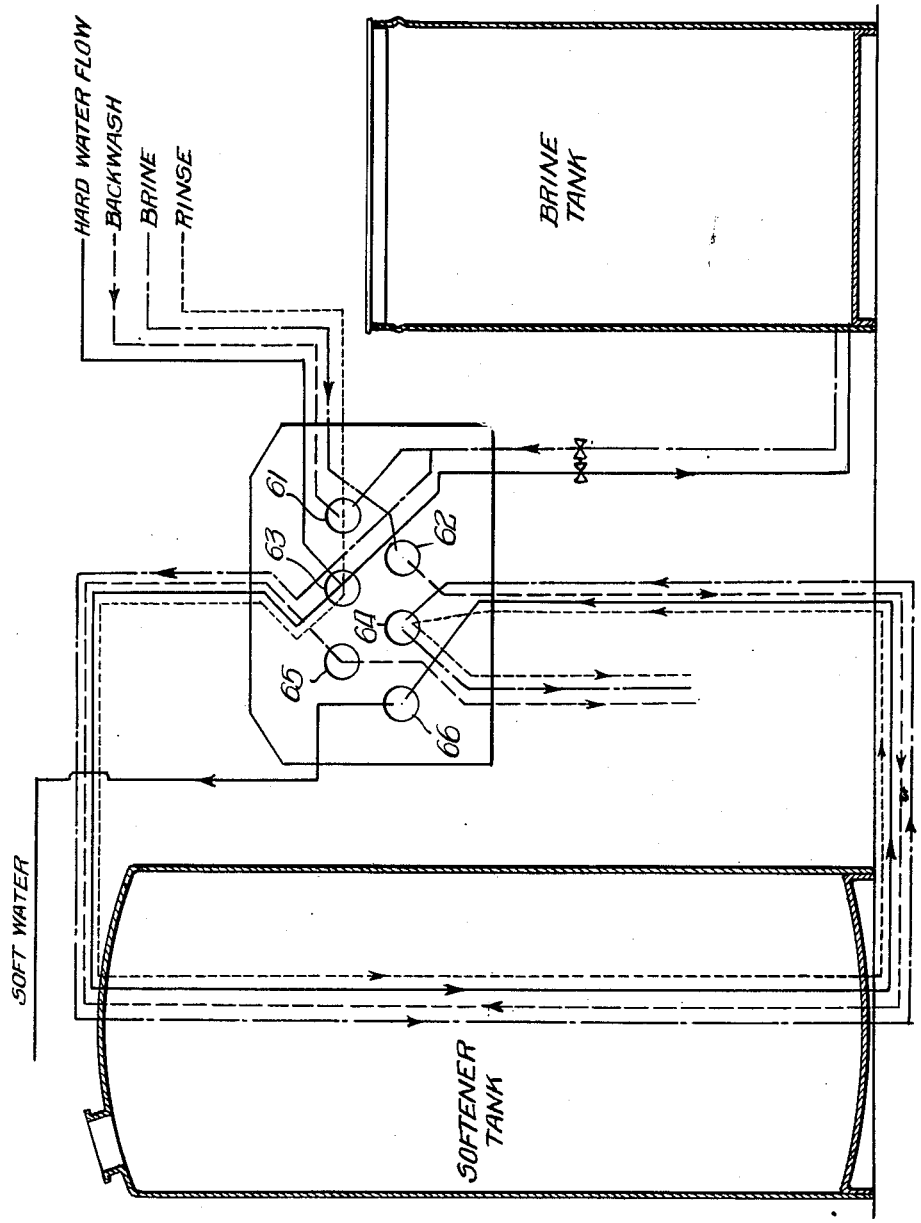
Figure 1 is a somewhat diagrammatic layout of water softening apparatus using my improved valve.
Figure 2:
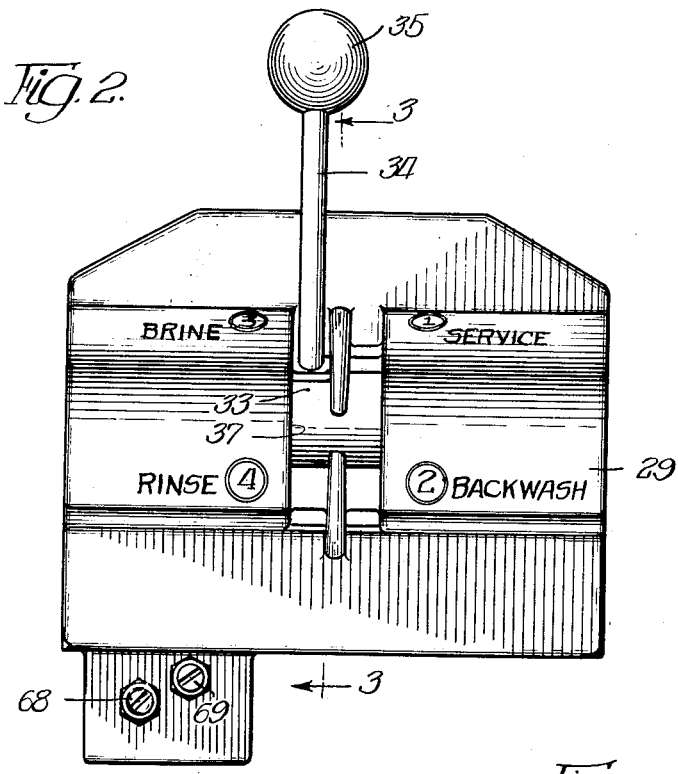
Figure 2 is a face view of the valve assembly.
Figure 3:
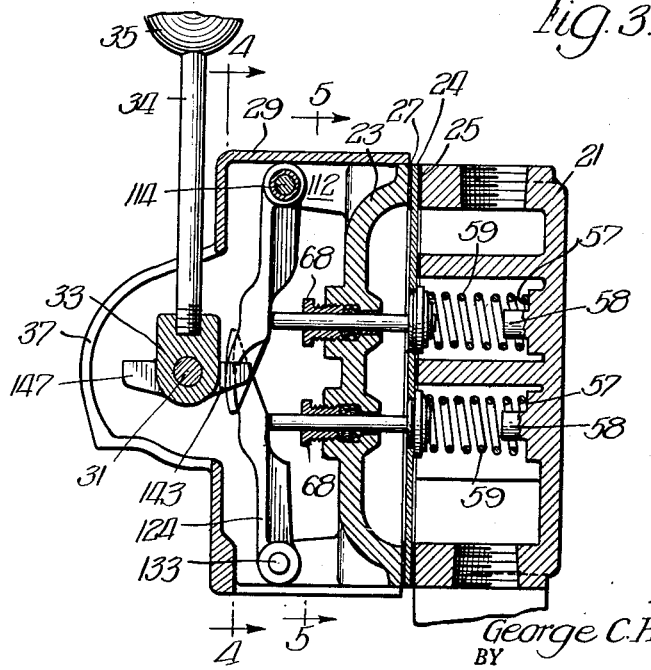
Figure 3 is a section taken on line 3—3 of Figure 2.

Referring first to Figures 2 and 3, the valve assembly comprises the body member 21 and the closure member 23, with the valve seat member 24 between members 21 and 23 and separated from them by gaskets 25 and 27. The housing 29 is fitted about the closure member 23. The body member 21 carries the fixed shaft 31 upon which the cam member 33 slides and rotates. The operating lever 34, with ball handle 35, is threaded into the cam member 33 and extends out of housing 29 through the H-shaped slot 37.

The valve may be used to control multiple fluid flow paths in cyclic succession for a variety of purposes but, by way of example, the several valves, chambers and passages will be described in detail in connection with the manipulation of the valve to control the use and regeneration of water softening apparatus. Referring next to Figure 8, the valve body 21 is shown as provided with six threaded openings in its lateral walls, each opening communicating with a separate chamber in the valve body. The upper opening 39 is normally connected by a pipe with the top of the water softener tank and leads to chamber 40 in valve body 21. The right opening 42 is normally connected to the line bringing in the hard water and leads to chamber 43. The lower right opening 45 normally connects to the brine tank and leads into chamber 46. The middle bottom opening 48 normally connects to the bottom of the softener tank and leads to chamber 49. The lower left opening 51 is normally connected to a drain pipe and leads to passages 52 and 53. The upper left opening 54 normally connects to the pipe system, distributing soft water from the softener, and communicates with chamber 55 in the valve body 21. The effective passage areas through passages 52 and 53 are controlled by adjustment of screws 68 and 69.

As shown in section and elevation in Figure 3, and in plan in Figure 8, the several chambers 40, 43 and 49 have platforms 57 and studs 58 formed in their bottoms. Valve springs 59 have their lower ends seated on the platforms 57 and held against displacement by the studs 58. These springs 59 serve to hold the valves up against their seats formed in the under face of the valve seat member 27. The six valves have been indicated in the drawings as numbers 61 to 66, being shown in Figure 9, and having valve stems 71 to 76 inclusive as shown on Figures 9 and 10. These valve stems extend up above the closure member 23, passing through the fluid tight glands 68.

The closure member 23, the under face of which is shown in Figure 10, has no external ports but is provided with a plurality of chambers. These chambers include chamber 78, which communicates through valve 61 with the valve body chamber 43, the chamber 79 which communicates through valve 63 with the same valve body chamber 43 and the chamber 80 which communicates through valve 62 with the same valve body chamber 43. In addition, the closure member 23 is provided with chamber 82 which communicates through valve 64 with valve body chamber 49, the chamber 83 which communicates through valve 65 with the valve body chamber 49, and with chamber 84 which communicates through valve 66 with valve body chamber 49.

The closure member 23 is provided with a bore 86 connecting chamber 78 with a passage 87 formed in the closure member 23, the passage being shown on an enlarged scale in Figure 11. The outer end of passage 87 is closed by a threaded plug 89. Passage 87 terminates in a reduced passage 90, the jet nozzle 92 being held against the shoulder between passages 87 and 90 by the spring 94, the opposite end of the spring engaging the inner face of the plug 89. The nozzle 92 projects into chamber 95 in member 23, the nozzle being in alignment with the Venturi tube 97 which connects chamber 95 with chamber 79.

It is to be noted that the valve seat member 24, shown in plan view in Figure 9, in addition to providing openings and valve seats for valves 61 to 66 inclusive also has a plurality of openings therein which are not valve controlled. The opening 101 maintains communication between the valve body chamber 46 and closure chamber 95. The opening 103 connects body chamber 49 and closure chamber 80. The opening 105 connects body passage 52 and closure chamber 83, while opening 106 connects body passage 53 and closure chamber 82. The opening 107 connects body chamber 55 and closure chamber 84 and opening 109 connects body chamber 40 and closure chamber 79.

Referring next to Figures 4, 5, 6 and 7, the lugs 111 and 112 extend upwardly from the closure 23 and support the shaft 114 upon which are pivoted the levers 121, 123 and 125 which engage the upper ends of valve stems 71, 73 and 75 respectively. Similarly, the lugs 130 and 131 support shaft 133 which carries levers 122, 124 and 126 which engage the upper ends of valve stems 72, 74 and 76 respectively. The plurality of bolts 135 hold the main assembly ports 21, 23 and 24 together against the gaskets 25 and 27, as shown also in Figure 3.

The shaft 31, carrying cam member 33, is supported by brackets 136 and 137. The cam member 33, as best shown in Figures 6 and 7, carries the integral cam lugs 141, 142, 143 and 144 on one side and integral cam lugs 146, 147, 148 and 149 on the opposite side.

In the use of the valve, with the lever 34 in the number 1 position, the cam slide 33 is moved to the right and is rotated to the right or clockwise, as seen in Figure 3. This causes the cam lug 143 to depress cam lever 123, thus pressing down on valve stem 73 and opening valve 63. In this position, the cam lug 141 depresses lever 126 and valve stem 76, opening valve 66. With these valves open and the other four valves closed, the system serves to pass hard water through the softener tank in the downward direction and delivers soft water from the bottom of the tank.

The hard water enters chamber 43, Figure 8, through opening 42 and passes up through valve 63 to chamber 79, Figure 10. From chamber 79 the hard water passes down through opening 109, Figure 9, to chamber 40 and out through opening 39 to the top of the softener tank. From the bottom of the softener tank, the soft water enters the valve through opening 48 to chamber 49. It passes valve 66 to enter chamber 84 from which it flows downwardly through opening 107, Figure 9, into chamber 55, Figure 8, and out through opening 54 to the service lines.

When the material in the softener tank requires regeneration, the first step is the back washing of the material, thus cleaning it of impurities trapped therein by the rough filtering action of the material. To carry out this step, the lever 34 is moved to position number 2, which means that the cam slide 33 is not moved longitudinally but rotated in the counterclockwise direction as seen in Figure 3 to its limit of movement, at which time the cam lug 146 depresses lever 125 to open valve 65 and the cam lug 148 depresses lever 122 to open valve 62. The line of flow then permits the hard water from the main to enter chamber 43 through opening 42, pass through valve 62 to chamber 80, from chamber 80 through opening 103 to chamber 49, from which it passes out through opening 48 to the bottom of the softener tank. From the top of the softener tank, it returns to the valve body through opening 39 to chamber 40. From chamber 40 it passes upwardly through valve 65 to chamber 83, from which it passes downwardly through openings 105 to passage 52 and out through opening 51 to the drain. Flow through passage 52 is controlled by proper adjustment of screw 68 for each installation.

After this back washing operation is complete and clean water is passing to the drain, the valve handle is moved to the number 3 position to carry out the brine treatment of the softening material. In this position, the cam lug 144 depresses lever 121, opening valve 61, and cam lug 142 depresses lever 124, opening valve 64. The untreated hard water enters opening 42 to chamber 43 and passes upwardly through valve 61 to chamber 78. From this chamber 78, it passes through bore 86 to passage 87 and through jet nozzle 92 and Venturi sleeve 97 to chamber 79. At the same time, brine is drawn from the brine tank through opening 45 to chamber 46, passing through opening 101 to chamber 95 between the jet nozzle 92 and venturi 97. Thus, the brine is mixed with the water under pressure and they pass together to chamber 79 from which they pass through opening 109 to chamber 40 and through passage 39 to the top of the softener tank. From the bottom of the softener tank, the used brine enters the valve assembly through passage 48 to chamber 49. Valve 64 is open and the used brine passes through valve 64 to chamber 82 and down through openings 106 to passage 53 and out the drain. Flow through passage 53 is controlled by proper adjustment of screw 69 for each installation.

It is to be noted that a separate valve, which may be of any usual type, is located in the pipe connecting the brine tank and multiple valve. This separate valve is opened during the brining operation.

When regeneration is completed, the handle 34 is moved to position number 4 to rinse the salt from the regenerated softener material. With the handle in this position, the adjustable cam 150 depresses lever 123 to open valve 63 and cam 147 depresses lever 124 to open valve 64. This rinse flow passes downwardly through the softener tank. The untreated water enters the valve body through opening 42 to chamber 43. From chamber 43 it passes through valve 63 to chamber 79, from which it passes through opening 109 to chamber 40 and out through opening 39 to the top of the softener tank. From the bottom of the softener tank, the rinse water returns to the valve housing through opening 48 to chamber 49. From chamber 49 it passes up through valve 64 to chamber 82, from which it passes downwardly through openings 106 to passage 53 and out through opening 51 to the drain. When this rinse water is free of salt, the cycle is completed and the lever 34 is returned to the number 1 position to provide soft water to the service lines. This rinse flow is also controlled by the adjustment of screw 69.

With the lever in the number 1 position, in addition to the downward flow through the softener tank, the hard water under pressure in chamber 78 flows through venturi 97 to chamber 95 and through opening 101 to chamber 46 which connects with the brine tank through opening 45. The external separate valve controls flow through the pipe connecting the multiple valve and the brine tank. This separate valve was closed after the brining operation. After the multiple valve is returned to number 1 position, the separate valve is opened for a period long enough to fill the brine tank to a level which is normally indicated on the tank or tank gauge. It will be understood that the brine tank is kept supplied with an excess of clean salt so that a saturated brine solution is available for the next regeneration.

While the valve has been described in connection with water softening apparatus, it may obviously be used to control predetermined cycles of fluid flow in connection with various chemical or fluid contact processes.

The valve construction is such that it may be entirely disassembled for inspection, cleaning or repair without disconnecting any piping. All valve seats are formed on a separate member which may be made of brass, while the cover and body members may be made of less expensive materials. The valve is adapted for use by unskilled persons and in a simple sequence of operations clearly marked on the apparatus. It is impossible for the user to use an incorrect combination of valves for any step in the process.

The construction shown is to be understood to be illustrative only as it is capable of variation to meet differing conditions and requirements, and I contemplate such modifications as come within the spirit and scope of the appended claims.

I claim:

1. A multiple valve assembly comprising a body, a valve plate seated on the body, a closure member seated on the valve plate, the body and closure members each having a plurality of chambers opening toward the valve plate, the valve plate closing all of said chambers, a plurality of passages through the valve plate connecting certain of said chambers, valves located in certain of the body chambers normally closing certain of said passages, said valves seating against the valve plate, valve stems extending through glands in the closure member in spaced parallel rows, levers pivotally supported from the closure, a different one of said levers engaging each of said valve stems, and means for selectively moving said levers to actuate their associated valves, said means comprising a cam carrying member pivotally supported from the closure, said means being slidable axially of the pivot, whereby it may selectively move levers to actuate one or more valves in either row.

2. A multiple valve assembly comprising a body, a valve plate and a closure member, the valve plate fitting between the body and the closure member, the body having a plurality of chambers therein, the closure member having a plurality of chambers therein, the valve plate serving to close both sets of chambers and having a plurality of passages therethrough, said passages serving to connect chambers in the body and closure member, and valve means located in chambers in the body closing certain of said passages, said valves having valve stems extending through the outer face of the closure member in a pair of spaced parallel rows, and means supported from the closure member for selectively depressing said valve stems, said latter means comprising a rod, and a member rotatably and slidably carried by said rod and having means for depressing one or more selected valve stems in either spaced row.

3. A multiple valve assembly comprising a body, a valve plate and a closure member, the valve plate fitting between the body and the closure member, the body having a plurality of chambers therein, the closure member having a plurality of chambers therein, the valve plate serving to close both sets of chambers and having a plurality of passages therethrough, said passages serving to connect chambers in the body and closure member, and valve means located in chambers in the body closing certain of said passages, said valves having valve stems extending through the outer face of the closure member in a pair of spaced parallel rows, and means supported by the closure member for selectively depressing said valve stems, said latter means comprising a rod extending intermediate the parallel rows of valve stems and a member rotatably and slidably carried by said rod, said latter member having extensions on either side whereby it may be selectively rotated to either side of the rod to operate one or more of the valves on that side, and may be moved along the rod to select among the valves on a given side of the rod.

4. A multiple valve assembly comprising a body, a valve plate and a closure member, the valve plate fitting between the body and the closure member, the body having a plurality of chambers therein, the closure member having a plurality of chambers therein, the valve plate serving to close both sets of chambers and having a plurality of passages therethrough, said passages serving to connect chambers in the body and closure member, and valve means located in chambers in the body closing certain of said passages, said valves having valve stems extending through the outer face of the closure in a pair of spaced parallel rows, and means supported by the closure member for selectively depressing the valve stems, said means comprising a rod extending intermediate the parallel rows of the valve stems and a member rotatably and slidably carried by the rod, said rotatable member having extensions on either side whereby it may be selectively rotated to either side of the rod to operate one or more of the valves on that side and may be moved along the rod to select among the valves on a given side of the rod, the means for operating the valve stems having a lever for manual operation extending away from the closure member and guide means supported from the closure member for guiding the lever whereby said extensions will engage preselected valve stems.

References Cited in the file of this patent

UNITED STATES PATENTS

| Number | Name | Date |
| --- | --- | --- |
| 1,279,650 | Bungay | Sept. 24, 1918 |
| 1,343,735 | MacBryde | June 15, 1920 |
| 2,231,460 | Barman | Feb. 11, 1941 |
| 2,275,963 | Herman | Mar. 10, 1942 |
| 2,302,663 | Campbell | Nov. 24, 1942 |
| 2,337,659 | Hughey | Dec. 28, 1943 |
| 2,372,311 | Brown | Mar. 27, 1945 |
| 2,472,309 | Opsahl | June 7, 1949 |
| 2,577,524 | Huppertz | Dec. 4, 1951 |

FOREIGN PATENTS

| Number | Country | Date |
| --- | --- | --- |
| 673,823 | Germany | Mar. 29, 1939 |